(12) United States Patent
Huang

(10) Patent No.: US 11,870,191 B2
(45) Date of Patent: Jan. 9, 2024

(54) CAR CONNECTION LINE

(71) Applicant: Shao Bo Huang, Taoyuan (TW)

(72) Inventor: Shao Bo Huang, Taoyuan (TW)

( * ) Notice: Subject to any disclaimer, the term of this patent is extended or adjusted under 35 U.S.C. 154(b) by 0 days.

(21) Appl. No.: 17/590,191

(22) Filed: Feb. 1, 2022

(65) Prior Publication Data
US 2023/0081334 A1 Mar. 16, 2023

(30) Foreign Application Priority Data
Sep. 10, 2021 (TW) ................................ 110210768

(51) Int. Cl.
| | | |
|---|---|---|
| *H01R 31/02* | (2006.01) | |
| *H01R 13/70* | (2006.01) | |
| *B60R 16/02* | (2006.01) | |
| *H01R 13/46* | (2006.01) | |
| *H01B 7/00* | (2006.01) | |

(52) U.S. Cl.
CPC ......... *H01R 31/02* (2013.01); *B60R 16/0207* (2013.01); *H01R 13/701* (2013.01); *H01B 7/009* (2013.01); *H01R 13/465* (2013.01); *H01R 2201/26* (2013.01)

(58) Field of Classification Search
CPC ..... H01R 13/6466; H05K 2201/10356; H05K 2201/09336; H05K 7/1417; H02G 15/064; H02G 3/18; H02G 1/00; H02G 15/08; H02G 11/02; H02G 15/085; H02G 15/117; H02G 3/00; H02G 3/12; H02G 3/123; H02G 3/14; H02G 3/0418; H02G 3/0437; H02G 3/0456; H02G 3/0493; H02G 3/128; H02G 3/383; H02F 1/005; H02G 1/1253; H02G 1/1265; H02G 3/03; H02G 3/04; H02G 3/081; H02G 3/121; H02G 3/16; H02G 3/28; H02G 3/286; H02G 3/305; H02G 3/083; H02G 3/30; H02G 3/36; H02G 7/04; H02G 7/18
See application file for complete search history.

(56) References Cited

U.S. PATENT DOCUMENTS

| | | | | |
|---|---|---|---|---|
| 5,964,609 A * | 10/1999 | Wilson | ................... | H01R 31/02 439/701 |
| 5,967,801 A * | 10/1999 | Martin | ............... | H01R 13/6466 439/76.1 |
| 6,319,048 B1 * | 11/2001 | Aekins | ................. | H01R 13/506 439/418 |
| 7,279,634 B1 * | 10/2007 | Chang | ..................... | G06F 1/189 174/50.5 |
| 7,604,515 B2 * | 10/2009 | Siemon | ............. | H01R 13/6463 439/676 |

(Continued)

*Primary Examiner* — Krystal Robinson
(74) *Attorney, Agent, or Firm* — MUNCY, GEISSLER, OLDS & LOWE, P.C.

(57) ABSTRACT

An automobile connection cable is configured with a controller area network (CAN-bus) circuit design and provided with a protocol interface between the J533 connector and USB Type-C. The function of switching between different protocols is achieved through the configuration of the cable assembly, so that the driver-assistance system ensures a better adaptability to the VAG vehicle models of Volkswagen Corporation (VAG). When the vehicle is shut off, the circuit control board can also control the constant power supply system between the external device and the vehicle, thereby reducing power consumption.

9 Claims, 7 Drawing Sheets

(56) References Cited

U.S. PATENT DOCUMENTS

| | | | | |
|---|---|---|---|---|
| 7,850,492 | B1* | 12/2010 | Straka | H05K 1/0228 |
| | | | | 439/676 |
| 9,601,886 | B1* | 3/2017 | Fransen | H01R 13/6466 |
| 9,991,649 | B1* | 6/2018 | Nguyen | H01R 13/7175 |
| 2005/0078467 | A1* | 4/2005 | Barr | H05K 3/222 |
| | | | | 361/818 |
| 2010/0319956 | A1* | 12/2010 | Ballard | H01B 9/003 |
| | | | | 174/105 R |
| 2011/0017491 | A1* | 1/2011 | Lu | H01B 7/0892 |
| | | | | 174/107 |
| 2012/0051701 | A1* | 3/2012 | Sicari | H02G 3/30 |
| | | | | 385/100 |
| 2014/0011403 | A1* | 1/2014 | Siev | H01R 24/64 |
| | | | | 439/620.23 |
| 2018/0040987 | A1* | 2/2018 | Marowsky | H01R 13/665 |

* cited by examiner

CAR CONNECTION LINE

BACKGROUND OF INVENTION

(1) Field of the Present Disclosure

The present disclosure relates to an automobile connection cable, and more particularly to an automobile connection cable externally connected to an automatic driving system.

(2) Brief Description of Related Art

The automatic driving system has gradually become a means for assisting vehicles. Its core technology is drive-by-wire, which refers to the use of electronic components instead of traditional mechanical elements as the main drive to control various components on the vehicle. As for automatic driving, the requirements of usage and derived application are diversified. Therefore, traditional vehicles need to be modified by wire control to adapt to the automatic driving system.

The present disclosure is especially aimed at a wide range of the VAG vehicle models of Volkswagen Corporation (VAG). The automobile connection cable thereof is more complicated. For example, a cable is usually used to connect the car's lens, and an additional cable is used to connect the on-board diagnostics (OBD). However, many old cars do not support the latest automatic driving system. Moreover, the externally connected components consume too much power when the vehicle is shut off. Accordingly, how to propose a simplified design that can support various VAG vehicle models of Volkswagen Corporation (VAG), reduce battery consumption and allow users to easily and conveniently connect to the driver-assistance system, is a problem that needs to be resolved.

SUMMARY OF INVENTION

It is a primary object of the present disclosure to provide a automobile connection cable that has a simplified design, supports various VAG vehicle models of Volkswagen Corporation (VAG), and reduces the battery consumption so that the automobile connection cable can be externally connected to the driver-assistance system easily and conveniently According to the present disclosure, when a first connector is connected to a second connector or a third connector, a connection port is electrically connected to one of twisted pairs between the first connector and the second connector for switching different protocols such that the driver-assistance system ensures a better adaptability to the VAG vehicle models (Volkswagen Corporation, VAG). When the vehicle is shut off, a circuit control board can also cut off the constant power supply system between the external device and the vehicle, thereby reducing power consumption.

DETAILED DESCRIPTION OF PREFERRED EMBODIMENTS

Figure 1:
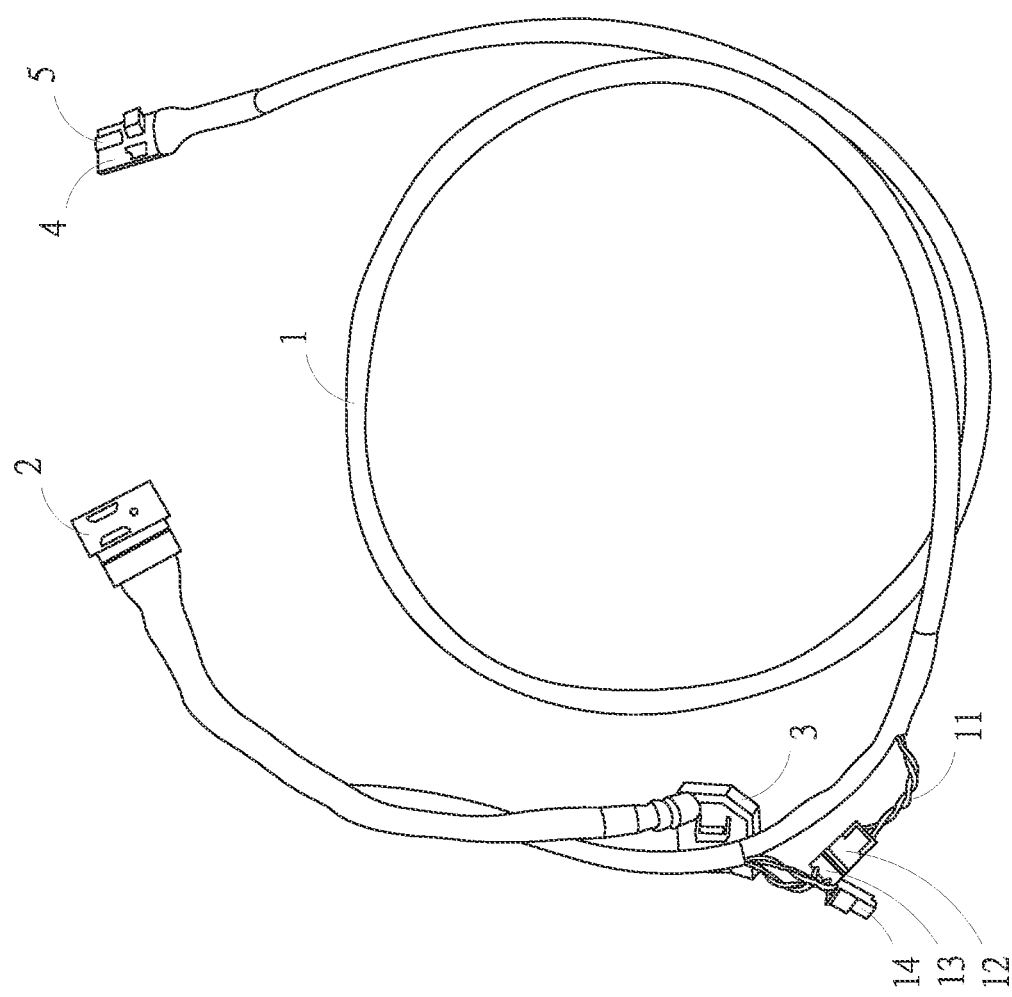
FIG. 1 is a structure diagram of an automobile connection cable of the present disclosure.
Figure 2:
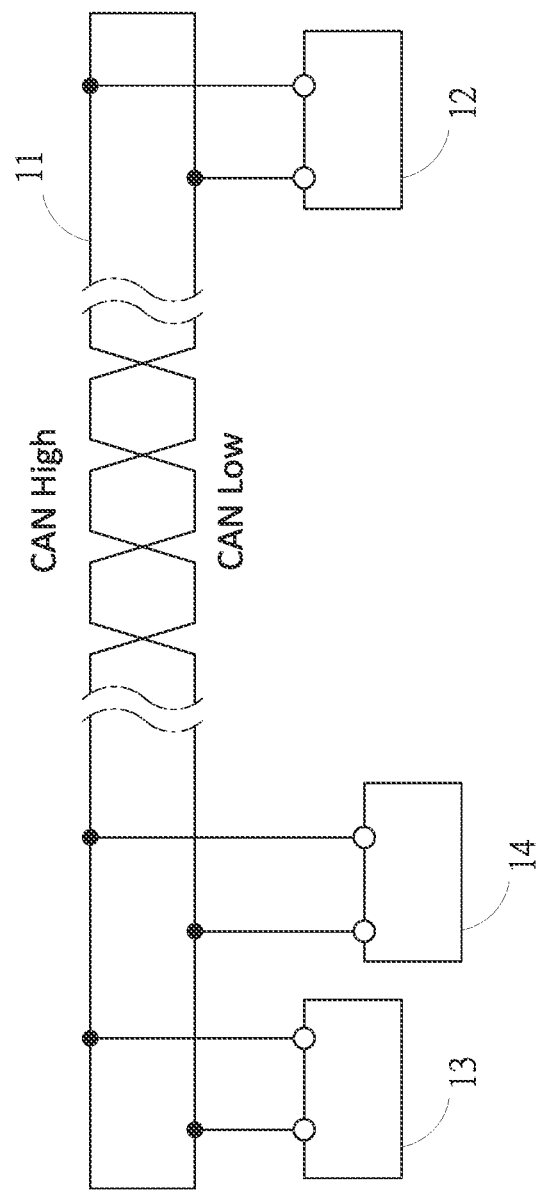
FIG. 2 is a schematic drawing of a cable assembly of the present disclosure.

Referring to FIG. 1 and FIG. 2, an automobile connection cable of the present disclosure includes a cable assembly 1, a first connector 2, a second connector 3, a circuit control board 4, and a connection port 5. The first connector 2, the second connector 3, and the circuit control board 4 are electrically connected through the cable assembly 1. The cable assembly 1 includes a plurality of twisted pairs 11 of the controller area network (CAN-bus) for automotive specifications. Meanwhile, a first connector 12, a second connector 13, and a third connector 14 are connected with the twisted pair 11. The first connector 12 can be used to connect with the second connector 13 or the third connector 14 for switching between different CAN-bus protocols such that the driver-assistance system ensures a better adaptability to the VAG vehicle models (Volkswagen Corporation, VAG). The first connector 2 is employed to be externally connected to an advanced driver-assistance system (ADAS). The second connector 3 is employed to externally electrically connect the gateway of the VAG vehicle models (Volkswagen Corporation, VAG). The first connector 2 and the second connector 3 can be a J533 connector.

Figure 3:
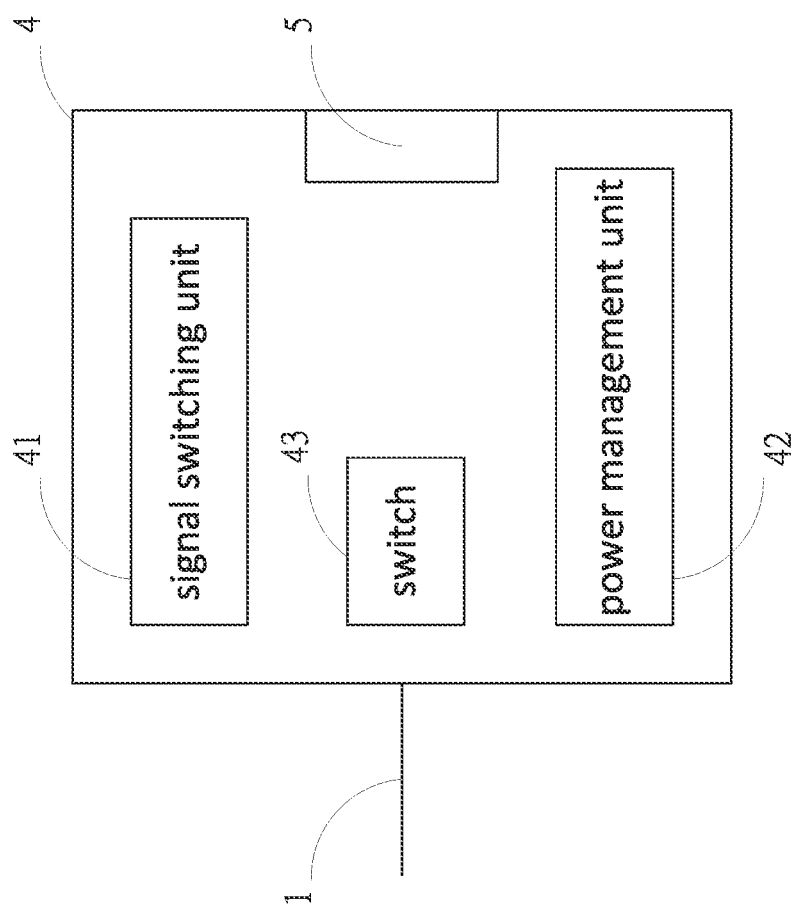
FIG. 3 is a block diagram of a circuit control board of the present disclosure.
Figure 4:
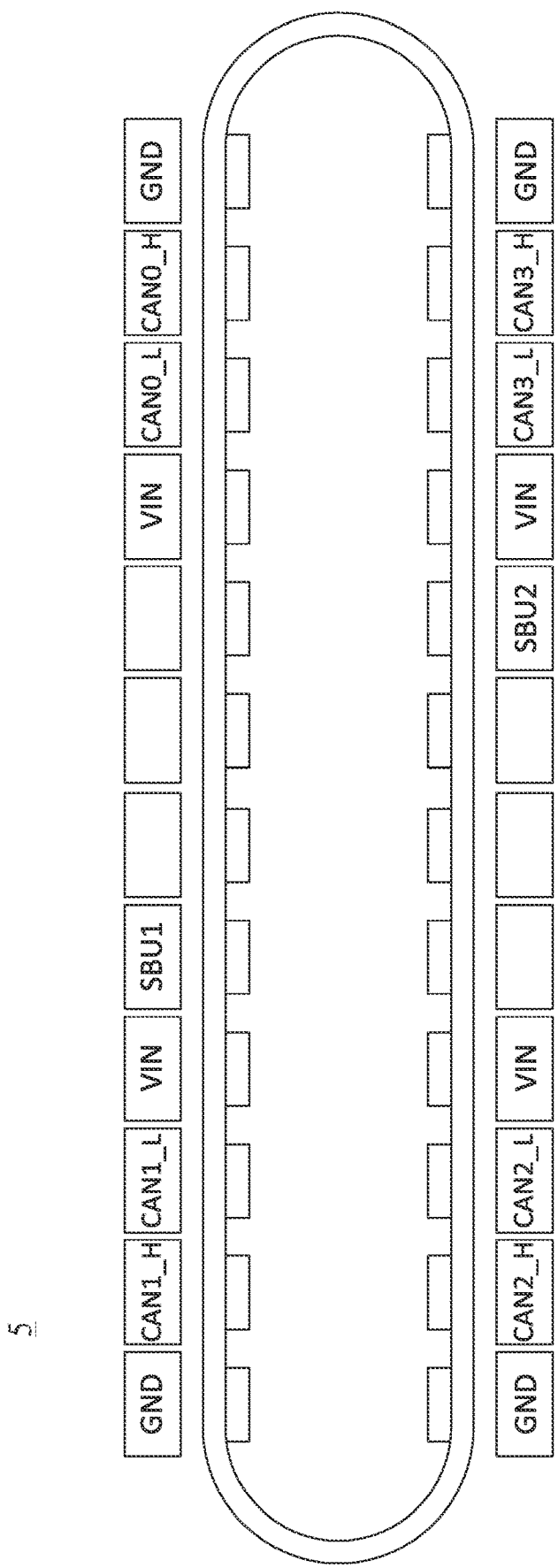
FIG. 4 is a configuration diagram of conductive terminals of a connection port of the present disclosure.

As shown in FIG. 3, the connection port 5 is disposed on the circuit control board 4. The connection port 5 can be one of USB Type-C, Lightning, Micro-USB, mini-USB, or DisplayPort. Preferably, the connection port 5 is a female port of USB Type-C. As shown in FIG. 4, the connection port 5 includes a plurality of conductive terminals, such as CAN0_H, CAN0_L, CAN1_H, CAN1_L, CAN2_H, CAN2_L, CAN3_H, and CAN3_L. The connection port 5 is connected to the first connector 2 and the second connector 3 through the cable assembly 1.

Referring to FIG. 3, the circuit control board 4 includes a signal switching unit 41, a power management unit 42, and a switch 43. The above-mentioned units can be System-On-Chip (SoC) or System-In-Package (SiC) which is packaged as a microcontroller unit (MCU) and is formed on the circuit control board 4.

Figure 5:
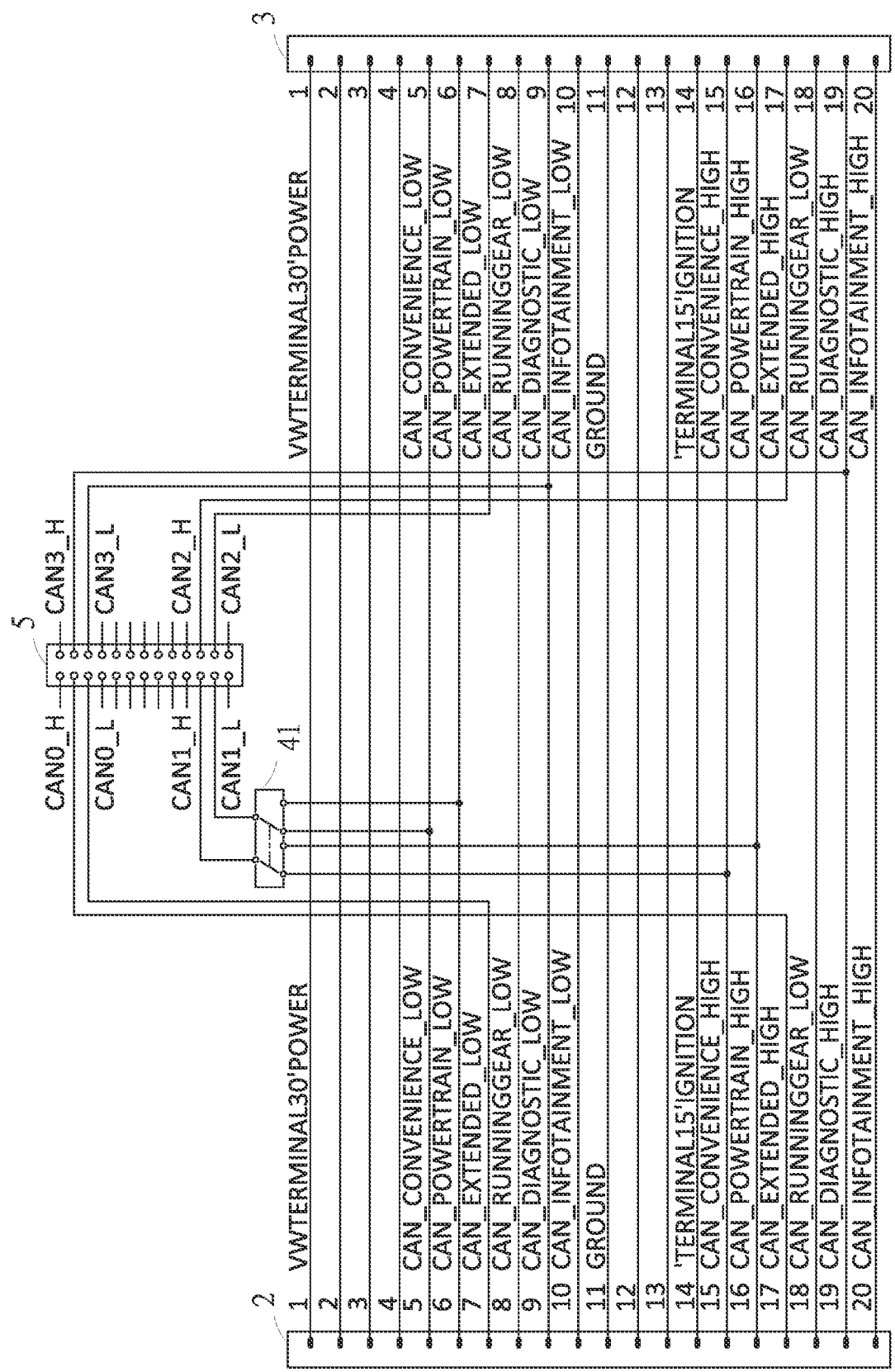
FIG. 5 is a schematic diagram of a vehicle control circuit of the present disclosure.

The signal switching unit 41 can be used to switch between different CAN-bus protocols. When the first connector 12 is connected to the second connector 13 or the third connector 14, the signal switching unit 41 controls the connection port 5 to be connected to one of the twisted pairs 11 between the first connector 2 and the second connector 3 according to the protocol selected by the user. In this way, the driver-assistance system ensures a better adaptability to VAG vehicle models (Volkswagen Corporation, VAG). As shown in FIG. 5, the VAG vehicle models (Volkswagen Corporation, VAG) include a transverse engine modular platform (Modular Querbaukasten, MQB) and a PQ platform. When the first connector 12 is connected to the second connector 13, the signal switching unit 41 switches the CAN1_H and CAN1_L of the connection port 5 through a first twisted pair of the twisted pairs 11 to switch between the CAN_POWERTRAIN_HIGH and CAN_POWERTRAIN_LOW of the first connector 2 and the second connector 3. When the first connector 12 is connected to the third connector 14, the signal switching unit 41 switches the CAN1_H and CAN1_L of the connection port 5 through the first twisted pair to connect with the CAN_convenience_HIGH of the first connector 2 and the CAN_convenience_LOW of the second connector 3. The above-mentioned is only an example and should not be limited thereto. Also, the signal switching unit 41 can switch the CAN1_H and CAN1_L of the connection port 5 through the first twisted pair to connect with the CAN_convenience_LOW of the first connector 2 and the CAN_convenience_HIGH of the second connector 3, and vice versa.

As shown in FIG. 5, CAN0_H and CAN0_L of the connection port 5 are connected to CAN_EXTENED_HIGH and CAN_EXTENED_LOW of the first connector 2 through a second twisted pair of the twisted pairs 11 to transmit the signal of the driver-assistance system to an electronic control unit (ECU). Meanwhile, CAN2_H and CAN2_L of the connection port 5 are connected to CAN_EXTENED_HIGH and CAN_EXTENED_LOW of a second connector 3 through a third twisted pair of the twisted pairs 11 to transmit the control signal of the electronic control unit (ECU) captured through the gateway to the driver-assistance system. Moreover, CAN3_H and CAN3_L of the connection port 5 are connected to CAN_DIAGNOSTIC_HIGH and CAN_DIAGNOSTIC_LOW of the first connector 2 and the second connector 3 through a fourth twisted pair of the twisted pairs 11.

The power management unit 42 can be employed to control an external device (such as an electronic product provided with an operating interface of the driver-assistance system) and the electronic circuit of the vehicle's own constant power supply system according to a time condition set by the user. For example, if the user sets the vehicle to shut off for 30 minutes, and then cuts off the external device and the vehicle's ignition system (Ignition, IGN), the power management unit 42 will cut off the constant power supply system between the external device and the vehicle according to this time condition after the vehicle is shut off for 30 minutes. Accordingly, the external device enters into the power saving mode when the vehicle is shut off, thereby reducing battery consumption. Moreover, when the vehicle starts again, the power management unit 42 reconnects the constant power supply system between the external device and the vehicle.

The switch 43 can be employed to forcibly bypass the external device and the electronic circuit of the vehicle's own constant power supply system. The switch 43 can be a mechanical switch (such as a button) or an electronic switch (such as a trigger circuit), etc. For example, when the switch 43 is triggered, no matter whether the power management unit 42 cuts off/switches on the electronic circuit between the external device and the constant power supply system of the vehicle according to the time conditions set by the user, the switch 43 creates a bypass loop so that the constant power supply system between the external device and the vehicle is electrically connected, thereby keeping the external device in a constantly powered state.

Figure 6:
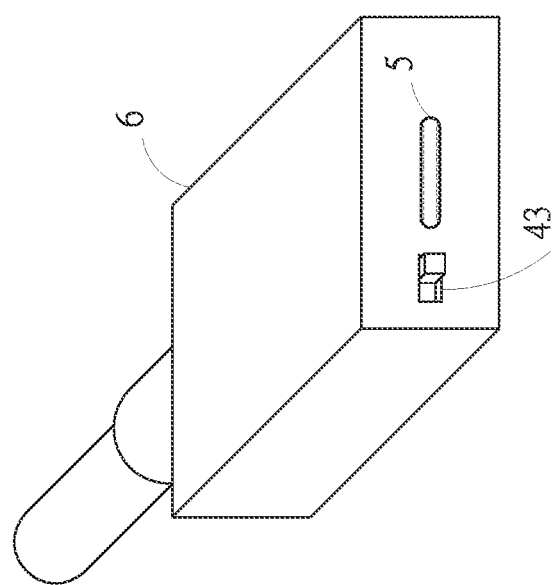
FIG. 6 is a schematic view of a first embodiment of the present disclosure.

As shown in FIG. 6, one end of the automobile connection cable according to the embodiment is covered with a housing 6. The circuit control board 4 and the connection port 5 are positioned inside the casing 6 such that the circuit control board 4 and the connection port 5 are stabilized in place and protected. The housing includes a plurality of through holes into which the switch 43 and the connection port 5 are extended.

Figure 7:
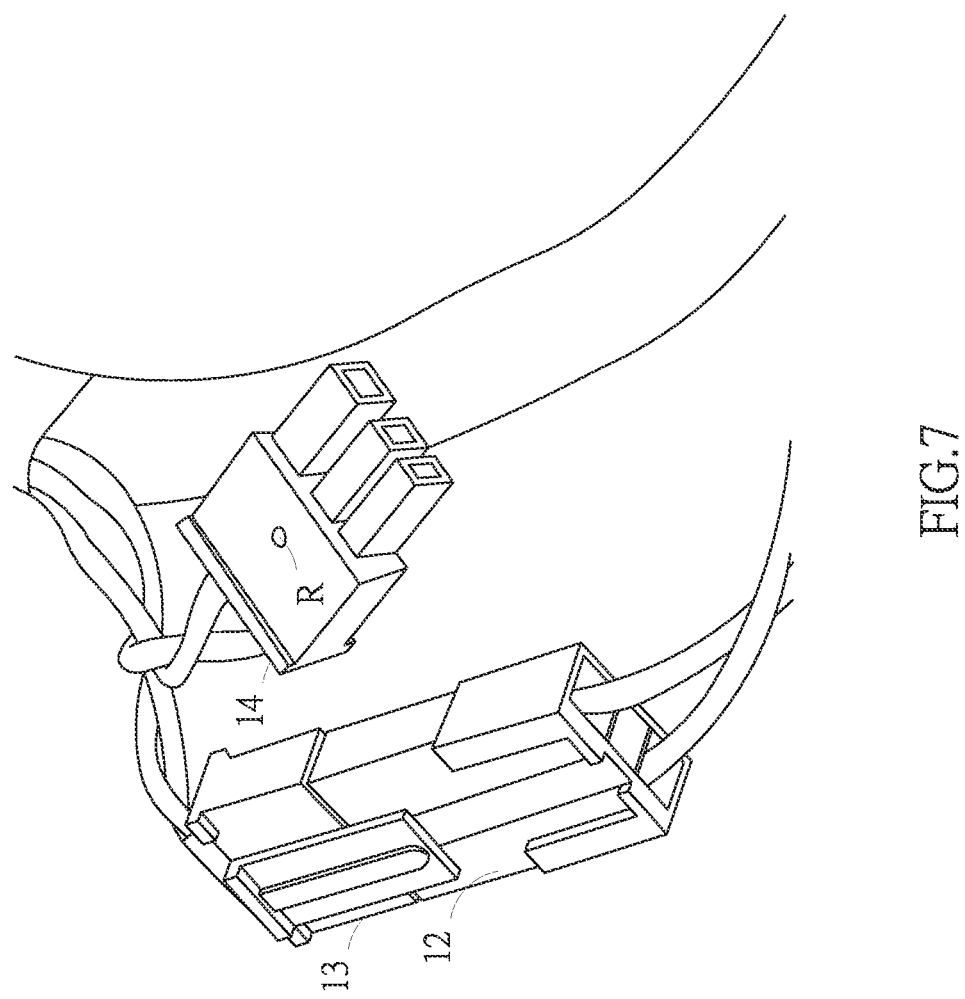
FIG. 7 is a schematic view of a second embodiment of the present disclosure.

As shown in FIG. 7, both the second connector 13 and the third connector 14 include an identification portion R for the user to distinguish that the second connector 13 and the third connector 14 belong to the MQB platform or the PQ platform. The identification portion R can be an identification label pasted on the second connector 13 and the third connector 14, an identification text engraved on the second connector 13 and the third connector 14, or a cavity or a protrusion formed on the second connector 13 and the third connector 14, or a combination thereof.

According to the present disclosure, the first connector and the second connector of the J533 connector are respectively connected to the driver-assistance system and the gateway of the VAG vehicle models (Volkswagen Corporation, VAG). Based on the wiring configuration of the cable assembly, the protocol interface between the J533 connector and USB Type-C are designed to be matched with CAN-bus. When the first connector is connected with the second connector or with the third connector, the connection port is electrically connected to one of the twisted pairs between the first connector and the second connector to switch between different CAN-bus protocols so that the driver-assistance system ensures a better adaptability to the VAG vehicle models (Volkswagen Corporation, VAG). When the vehicle is shut off, the circuit control board can also control the electronic circuit between the external device and the vehicle, thereby reducing power consumption. Accordingly, the purpose of providing a simplified design is achieved. Meanwhile, the automobile connection cable can be applied to a variety of VAG vehicle models of Volkswagen Corporation (VAG). In addition, the battery consumption can be reduced. Furthermore, the automobile connection cable of the present disclosure can be externally connected to the driver-assistance system easily and conveniently.

Reference sign
1 cable assembly
11 twisted pair
12 first connector
13 second connector
14 third connector
R identification portion
2 first connector
3 second connector
4 circuit control board
41 signal switching unit
42 power management unit
43 switch
5 connection port
6 housing
FIG. 3
signal switching unit 41
switch 43
power management unit 42

What is claimed is:
1. An automobile connection cable, comprising:
 a cable assembly being electrically connected a first connector (2), a second connector (3), a circuit control board, and a connection port, wherein the connection port is formed on the circuit control board;
 the cable assembly having a plurality of twisted pairs with which a first connector (12), a second connector (13), and a third connector (14) are electrically connected; and
 the twisted pairs having a first twisted pair, a second twisted pair, a third twisted pair, and a fourth twisted pair, wherein the first twisted pair is provided with the first connector (12);
 wherein when the first connector (12) is connected to the second connector (13) or the third connector (14), the connection port is controlled to be connected to one of the twisted pairs between the first connector (2) and the second connector (3) to switch between different protocols, the connection port is connected to the first connector (2) and the second connector (3) through the first twisted pair, the connection port is connected to the first connector (2) through the second twisted pair, the connection port is connected to the second connector (3) through the third twisted pair, and the connection port is connected to the first connector (2) and the second connector (3) through the fourth twisted pair.

2. The automobile connection cable as claimed in claim 1, wherein the circuit control board includes a signal switching unit, and wherein, when the first connector (12) is connected to the second connector (13) or the third connector (14), the signal switching unit is employed to electrically connect the connection port to one of twisted pairs between the first connector (2) and the second connector (3).

3. The automobile connection cable as claimed in claim 1, wherein the circuit control board includes a power management unit for cutting off an electronic circuit between an external device and a vehicle according to a time condition.

4. The automobile connection cable as claimed in claim 3, wherein the circuit control board includes a switch for forcibly bypassing the electronic circuit between the external device and the vehicle.

5. The automobile connection cable as claimed in claim 1, further comprising a housing in which the circuit control board and the connection port are disposed.

6. The automobile connection cable as claimed in claim 1, wherein the second connector (3) and the third connector (4) include an identification portion, and wherein the identification portion is selected from a group consisting of an identification label, an identification text, a cavity, a protrusion, or a combination thereof.

7. The automobile connection cable as claimed in claim 1, wherein the first connector (2) and the second connector (3) are a J533 connector, respectively.

8. The automobile connection cable as claimed in claim 1, wherein the twisted pair are the twisted pairs of the controller area network (CAN-bus) for automotive specifications.

9. The automobile connection cable as claimed in claim 1, wherein the connection port is one of USB Type-C, Lightning, Micro-USB, mini-USB, and DisplayPort.

* * * * *